April 7, 1964  W. A. LEDWITH  3,127,737
NOZZLE TUBE CONSTRUCTION
Filed March 29, 1961

INVENTOR
WALTER A. LEDWITH
BY Charles A. Warren
ATTORNEY 3,127,737
NOZZLE TUBE CONSTRUCTION
Walter A. Ledwith, Glastonbury, Conn., assignor to United Aircraft Corporation, East Hartford, Conn., a corporation of Delaware
Filed Mar. 29, 1961, Ser. No. 99,271
2 Claims. (Cl. 60—35.6)

This invention relates to a cooled rocket nozzle wall or combustion chamber wall and is in certain respects an improvement over U.S. Patent No. 3,004,386.

One feature of this invention is an annular wall varying in diameter from end to end and made up of a plurality of tubes which at the smaller diameters of the wall are in side-by-side relationship and are attached together and which at larger diameters are spaced apart such that other intermediate tubes are positioned therebetween and gradually merge with the first tubes as the wall diameter decreases. Another feature of this invention is the gradual merging of two adjacent tubes in the larger diameter portion of the wall with one another in order that no tube will be excessively large in dimension so that the flow path for the cooling fluid may be always for a small cross-sectional area with relatively high fluid velocity therethrough. Another feature of the invention is the modification of adjacent tubes between large and small diameter of a wall so that the adjacent tubes will gradually merge to a single tube but with the merging tubes so constructed as to fill the wall space existing at all points.

Other objects and advantages will be apparent from the specification and claims, and from the accompanying drawing which illustrates what is now considered to be a certain preferred embodiment of the invention.

Figure 1:
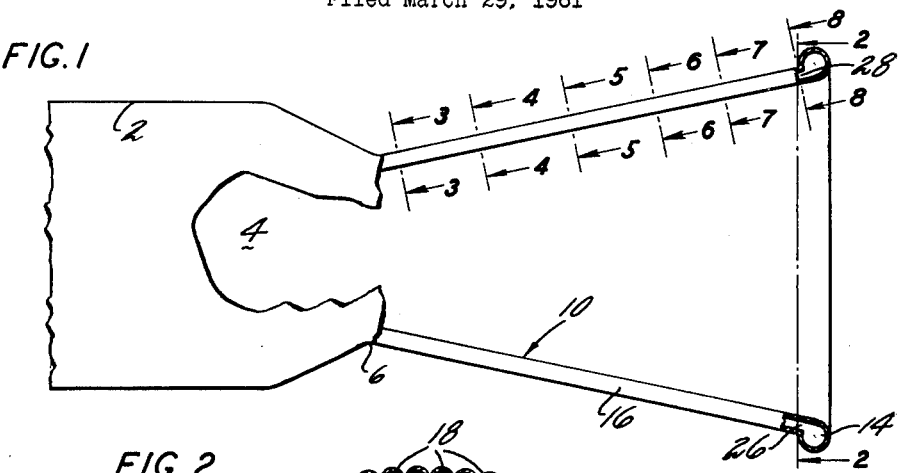
Figure 2:
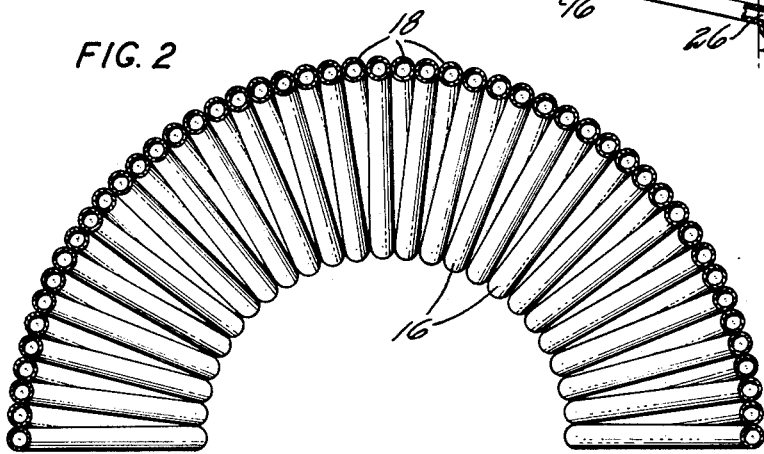
Figure 3:
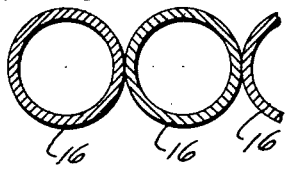
Figure 4:
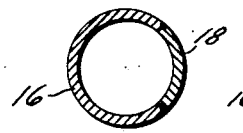
Figure 5:
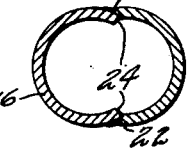
Figure 6:
Figure 7:
Figure 8:
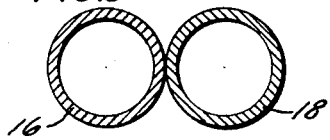
Figure 9:

FIG. 1 is a longitudinal sectional view through a nozzle and combustion chamber;
FIG. 2 is a sectional view substantially along the line 2—2 of FIG. 1;
FIG. 3 is a fragmentary transverse sectional view along the line 3—3 of FIG. 1;
FIG. 4 is a second transverse sectional view along the line 4—4 of FIG. 1;
FIG. 5 is a transverse sectional view substantially along the line 5—5 of FIG. 1;
FIG. 6 is a transverse sectional view substantially along the line 6—6 of FIG. 1;
FIG. 7 is a transverse sectional view substantially along the line 7—7 of FIG. 1;
FIG. 8 is a transverse sectional view substantially along the line 8—8 of FIG. 1;
FIG. 9 is a plan view of two adjacent tubes removed from the remainder of the wall structure.

The invention is shown in a rocket having a wall 2 defining a combustion chamber 4. The wall is annular and decreases in diameter to define a throat 6 for the nozzle and then increases in diameter to define the divergent portion 10 of the nozzle. This divergent portion terminates in the trailing or downstream edge of the nozzle. The wall 2 is made up of a plurality of axially extending tubes constructed for flow of a coolant therethrough by which to maintain the combustion chamber and nozzle wall from overheating during operation of the rocket. The coolant is preferably supplied to the combustion chamber from a manifold 14 surrounding the nozzle wall adjacent the trailing edge and this manifold supplies a cooling fluid preferably one of the propellants to the tubes making up the nozzle wall. With reference particularly to FIGS. 2 and 3, the wall adjacent the nozzle portion has the tubes 16 forming the wall arranged in side-by-side relationship and in contact with each other, these tubes being the entire wall. As the diameter of the combustion chamber wall of the nozzle wall increases in diameter, these tubes 16 diverge from one another so that, adjacent the trailing edge as shown best in FIGS. 2 and 8, the tubes 16 are spaced apart and a second set of intervening tubes 18 fit between the tubes 16 to form a continuous wall structure. It will be understood as best shown in FIG. 9 that the tubes 16 may taper to some extent being of smallest diameter at the throat and increasing somewhat in diameter in each direction to accommodate a part of the change in diameter of the wall. If the change in diameter of the wall is too great, the tubes 16 and also the tubes 18 may at the largest diameters be somewhat flattened in order to form a complete nozzle without the addition of any filler material between the tubes.

As shown in FIGS. 2 and 9, the tubes 16 are continuous and thus form a path for cooling fluid throughout the axial dimension of the wall construction. The tubes 18, however, because of the diminishing space between the tubes 16 are cut off at a long oblique angle 20 so that each tube 18 gradually merges with the adjacent tube 16. The scarfing of the tube 18 is such that at a point spaced somewhat from the trailing edge of the nozzle the tube 18 retains nearly its complete shape as shown in FIG. 7 and has the edges 22 of the oblique angle cut in contact with the outer surface of the adjacent tube 16 so that two dependent flow paths for the cooling system still exist at this point.

Further, upstream of the tubes as in FIG. 6 the tube 18 is cut away to a greater extent and the tube 16 still retains its full configuration so that two flow paths also exist at this point. However, between the section lines 6—6 and 5—5 each tube 16 is provided with a longitudinal slot 24 so that the position corresponding to the section line 5—5 the two flow paths have merged to a single flow path, the area of which is only slightly larger than the flow path for either of the tubes 16 or 18 at its full dimension. Obviously the edges of the oblique angle cut on the tube 18 will again be integrally attached to the tube 16, the attachment at this point being along the slot 24 in the tube 16. At a point further forward, as at the section line 3—3, the tube 18 has substantially disappeared and constitutes only a small portion in effect of the periphery of the tube 16.

It will be apparent that by suitable contouring of the oblique angle scarfing of the tube 18 and by corresponding shaping of the slot 24 in the tube 16, the merging of the two axial tubes 16 and 18 will be controlled to give whatever transverse dimension is necessary to fill the corresponding circumferential dimension in the nozzle wall. Further, by so arranging the wall construction that the fluid path is at least as large as the flow area for either tube 16 or 18 the rate of flow of the coolant through the fluid passages can be maintained at the necessary velocity to effectively cool the wall. Thus at the throat where heating is greatest, the flow area may be at a minimum so that the highest velocity of coolant flow will occur in this point. It will be understood as shown in FIG. 8 that the manifold 14 connects all of the tubes 16 which might be defined as alternate tubes since they alternate with the tubes 18 and also connect with all the intervening tubes 18 through openings 26 for the tubes 16 and other openings 28 for the tubes 18.

It is to be understood that the invention is not limited to the specific embodiment herein illustrated and described but may be used in other ways without departure from its spirit as defined by the following claims.

I claim:
1. A substantially annular wall construction for a rocket in which the wall varies in diameter from end-to-end including a set of axially extending first tubes arranged in a ring in the form of the annular wall, said first tubes being in side-by-side contacting relation and joined together at the smaller diameters of the wall and being spaced apart circumferentially at larger diameters of the wall, a set of axially extending second tubes positioned between said first set where the tubes of said first set are spaced apart, the tubes of said second set being scarfed along one side to accommodate said second set of tubes to the spacing provided between the tubes of said first set, the tubes of said first set being slotted adjacent the scarfing of the tubes of said second set and joined thereto so that said tubes of said first and second sets cooperate to form a single hollow channel while so merging to provide for a merging of the flow of coolant in the adjacent tubes.

2. A substantially annular wall construction for a rocket in which the wall varies in diameter from end-to-end including a set of first axially extending tubes extending substantially the full axial dimension of said wall and being arranged in a ring to form the annular wall, said tubes at smaller diameters of the wall being in side-by-side contacting relation and being spaced apart circumferentially at larger diameters of the wall to form a space between adjacent first tubes and a set of second axially extending tubes positioned between the first set where the tubes of the first set are spaced apart with each of said second tubes abutting and joined to adjacent tubes of said first set throughout the full space between adjacent first tubes and with each tube of the second set merging with an adjacent tube of the first set to form a single flow path for coolant through the adjacent tubes.

References Cited in the file of this patent

UNITED STATES PATENTS

| | | |
|---|---|---|
| 1,984,242 | Trainer et al. | Dec. 11, 1934 |
| 2,060,409 | Ball | Nov. 10, 1936 |
| 2,479,578 | Langvand | Aug. 23, 1949 |
| 2,958,183 | Singelmann | Nov. 1, 1960 |
| 2,975,591 | Fox | Mar. 21, 1961 |
| 2,977,754 | Bell | Apr. 4, 1961 |